United States Patent [19]

Knight

[11] Patent Number: 4,734,129

[45] Date of Patent: Mar. 29, 1988

[54] RECOVERY OF METALS FROM THEIR ALLOYS WITH LEAD USING CONSUMMABLE LANCE AND APPARATUS

[75] Inventor: Robert P. Knight, Strood, England

[73] Assignee: Britannia Refined Metals Limited, Gravesend, England

[21] Appl. No.: 872,916

[22] Filed: Jun. 10, 1986

[30] Foreign Application Priority Data

Jun. 10, 1985 [GB] United Kingdom ............... 8514587

[51] Int. Cl.⁴ .................. C22B 11/00; C22B 30/06; C22B 11/12
[52] U.S. Cl. .......................................... 75/63; 75/70; 75/83; 266/88; 266/226
[58] Field of Search ............... 75/70, 83, 63; 266/225, 266/226, 88

[56] References Cited

U.S. PATENT DOCUMENTS 2,506,598  5/1950  Johnson, Jr. ...................... 266/226

FOREIGN PATENT DOCUMENTS 981911  1/1976  Canada ............................ 75/83
3216930  11/1983  Fed. Rep. of Germany ......... 75/83

OTHER PUBLICATIONS

Tait, R. J. et al., Paper pub. by Dept. of Met & Engin. Materials at U. of Newcastle upon Tyne, Apr. 19, 1979, pp. M1–M10.

Primary Examiner—Melvyn J. Andrews
Attorney, Agent, or Firm—Wenderoth, Lind & Ponack

[57] ABSTRACT

A metal, especially silver, may be recovered from its alloy with lead by a method comprising injecting, into the molten alloy, an oxygen-containing gas to oxidize the lead to form lead oxide slag and removing the slag from the molten metal. The oxygen-containing gas is injected into the molten metal through an elongate consumable lance which extends lengthwise of itself from the interior to the exterior of the furnace and which is capable of being fed lengthwise from the exterior to the interior of the furnace through the guide tube as the lance is consumed in the furnace. The lance comprises a first elongate tube for the oxygen-containing gas and a second elongate tube located annularly about the first tube, for a coolant gas. A gas is also injected through the guide tube into the furnace to seal the lance. Also disclosed is a furnace suitable for use in the method.

14 Claims, 4 Drawing Figures

RECOVERY OF METALS FROM THEIR ALLOYS WITH LEAD USING CONSUMMABLE LANCE AND APPARATUS

The present invention relates to the recovery of metals from their alloys with lead. More particularly it relates to a method of recovering metals, such as noble metals, from their alloys with lead. It further relates to a furnace suitable for use in such a method.

In the recovery of noble metals, such as silver and gold, from both primary and secondary sources, the noble metals are associated with lead. The resulting lead "bullion" is then oxidised in the molten state in a suitable vessel whereby the lead is oxidised to form a liquid lead oxide slag which is skimmed off the surface of the molten alloy. Conventionally, the oxidation of the lead is carried out by the process known as cupellation. According to this process, the lead bullion is melted in a shallow reverberatory-type furnace which provides a large exposed area of molten metal. Air jets impinging on the surface of the molten metal cause the required oxidation of the lead and the resulting litharge slag can be removed more-or-less continuously. Unfortunately, this conventional cupellation method suffers a number of disadvantages:

(1) in order to maintain the molten metal at a temperature close to 1000° C., the energy consumption is necessarily high;
(2) the rate of oxidation of molten lead by air is slow;
(3) a higher degree of operator skill is required;
(4) in cases where the bullion additionally contains zinc, it is often necessary to remove the zinc in the form of a viscous litharge slag which results in high losses of precious metal into the slag;
(5) refractory wear on the inside of the furnace is relatively high at the slag/metal interface;
(6) because of the known hazards associated with air-borne lead, there is a requirement for a high volume of hygiene ventilation and process gas cleaning at the cupellation site.

An alternative procedure which uses a rotating furnace, known as a top-blown rotary converter (TBRC), overcomes, or at least ameliorates, some of the problems associated with conventional cupellation methods. According to this alterative procedure, oxygen or oxygen-enriched air is blown through a water-cooled lance onto the molten metal as the furnace rotates. The constant furnace rotation enhances gas-solid-liquid contact and, therefore, results in a higher rate of oxidation than is achieved in conventional cupellation. Furthermore, compared to the conventional cupellation method, the TBRC method presents significant advantages in terms of energy savings, operator skill, fluxing ability and process air pollution. Unfortunately the TBRC process suffers from a relatively high capital cost and high refractory wear due to the washing action of the slag. Furthermore, the oxidation rate and oxygen utilisation in a TBRC process are still fairly low.

In order to speed up cupellation by improving contact between the oxygen and the lead, a different process was proposed by D. J. Hallett, P. R. Hendra and R. J. Tait in "The Cupellation of Lead-Copper-Silver Bullion By the Bottom Injection of Oxygen", Gas Injection into Liquid Metals Conference, Dept. of Metallurgy and Engineering Materials, University of Newcastle upon Tyne, April 1979. According to this process, oxygen is injected into the bottom of a deep bath instead of air being blown over the surface of a shallow bath as in the conventional cupellation procedure. The oxygen is injected via a tuyere and protected by an annular shroud of nitrogen gas. The authors, however, reported an oxygen efficiency of only about 60% for the process. Furthermore, in this process, we have found that the tuyere is severely burnt back and the refractory hearth around the tuyere undergoes excessive erosion. The replacement of tuyeres and/or restoration of refractory linings would be a problem in industrial scale processes. Accordingly, there is still scope of improvement in this process.

We have discovered that we can achieve an oxygen efficiency much higher than has been reported by D. J. Hallett et al without suffering the disadvantages of their proposed process.

The present invention provides a method of recovering a metal selected from the noble metals and bismuth from an alloy containing lead and the metal comprising melting the alloy in a furnace, injecting into the melt a stream of oxygen-containing gas thereby oxidising the lead to form a lead oxide slag which stream is cooled by an annular shroud of a coolant gas, and removing the slag from the surface of the melt characterised in that the oxygen-containing gas and a first coolant gas are injected into the melt through an elongate, consumable lance formed of a first elongate tube for the oxygen-containing gas and a second elongate tube, located annularly about the first tube, for the first coolant gas, wherein the consumable lance extends lengthwise of itself from the interior to the exterior of the furnace through a lance guide tube provided in a wall of the furnace and is capable of being fed lengthwise from the exterior to the interior of the furnace through the guide tube as the lance is consumed in the furnace, and wherein a stream of a second gas is injected through the guide tube into the furnace to seal the lance.

Generally, the method of the invention can be used in the recovery of a metal, selected from bismuth and the group of noble metals, from its alloy with lead. However, the method of the invention is especially suitable for the recovery of silver from silver-lead bullion. For this reason, the invention will be further described with reference to its application in the recovery of silver. One or more other non-precious metals, such as antimony, arsenic, tellurium, selenium, zinc, copper and nickel, may also be present in the bullion in which case they are also removed by volatilisation or with the oxide slag. Although, the amount of silver in the bullion is not critical, for economic reasons the bullion will usually contain greater than 5% weight silver. Typically, the lead bullion will be concentrated by conventional means.

According to the method of the invention, a stream of oxygen-containing gas is injected into the molten bullion. The oxygen-containing gas is preferably oxygen itself although oxygen-enriched air or mixtures of oxygen with one or more other gases inert to the liquid metal in the bath, e.g. mixtures of oxygen and nitrogen, can also be used. The reaction of the oxygen with the lead to form lead oxide is exothermic and the heat produced by the oxidation reaction is absorbed by the contents of the bath. Because of this, the method is almost autogenous and the actual energy consumption of the method is relatively low compared to conventional cupellation. However, the injection of oxygen into the molten bullion causes very high localised temperatures to be produced at the location of oxygen injection into the melt. For this reason, the stream of oxygen-containing gas injected into the molten bullion is cooled by the flow of a coolant gas, such as nitrogen or mixtures of nitrogen and methane, injected into the molten alloy annularly about the stream of oxygen-containing gas. The coolant gas, thus, provides an annular shroud around the oxygen stream. According to the present invention, the oxygen-containing gas and the coolant gas are injected into the melt via an elongate, consumable gas shrouded lance. This lance comprises a core tube through which the oxygen-containing gas is injected and, located annularly about the core tube, an outer, lance tube. The coolant gas is injected into the melt through the annular opening formed by the outer wall of the core tube and the inner wall of the lance tube, thus forming an annular shroud around the injected stream of oxygen-containing gas.

As it becomes consumed or burnt-back during the oxidation of the lead, the lance, which extends through a guide tube located in a side or bottom wall of the furnace to a location on the exterior of the furnace, may be advanced lengthwise through the tube. By this means, it is possible to maintain or restore the length of the lance which projects from the refractory furnace wall into the furnace chamber.

In order to control the feeding of the lance to compensate for burning-back, a thermocouple is located within the core tube and passes through a sealing gland to allow the lance to move relative to the thermocouple. This thermocouple is held in a fixed position relative to the furnace and is used to detect the proximity of the lance tip as burning-back occurs. When this occurs, a rapid increase in temperature is detected and this signal is then used to operate a mechanical device which drives the lance further into the furnace chamber. As the lance tip moves away from the thermocouple the temperature is restored to its normal value.

The lance consumption during operation of the process is quite low, typically less than 4 cm per hour, on average.

As mentioned above, the consumable lance used in the present invention is gas sealed, i.e. it is provided with a flow of an inert gas. This inert gas is injected through the guide tube into the furnace. Although the gas used to shroud the lance need not be the same as the coolant gas used to provide the annular shroud around the oxygen-containing stream, the two gases will typically both be nitrogen. However, in an alternative embodiment, the shroud gas around the lance may contain or consist of a hydrocarbon gas, such as methane, since this could be beneficial in providing additional heat to the metal, particularly in the final stages of the process.

The temperature of the melt in the furnace during operation of the method of the invention is not critical but excessive operating temperature increases the refractory wear, lance consumption and fume generation. For this reason, we prefer to control the temperature of the melt such that it does not rise to a value of more than about 100° C. above the estimated liquidus temperature.

Obviously, as the refining continues, the lead content of the molten alloy falls as more and more lead is oxidized to litharge. Thus, with the relative rise in the silver content of the alloy, the liquidus temperature of the alloy rises until, near the end of the oxidation, it approaches the melting point of pure silver.

Typically, the temperature of the melt during the injection of the oxygen-containing gas is maintained at a level within the range of from 50° to 100° C. above the estimated liquidus temperature. Once the injection of oxygen-containing gas has commenced, the temperature of the melt can be controlled substantially by controlling the flow rates of the oxygen-containing gas and the coolant gases from the lance. However, near the end of the refining cycle when the oxidation rate is much lower, further heat should be supplied to the melt, such as by conventional burner. As the lead content of the melt decreases, the oxygen requirement also diminishes and therefore the flowrate of the oxygen-containing gas is preferably progressively reduced towards the end of the refining cycle. If the flowrate is not reduced, the excess unreacted oxygen cools the melt thus leading to the formation of an accretion of solid metal around the end of the lance, especially at the higher melt temperatures which exist towards the end of the oxidation stage.

The present invention further provides a furnace which is suitable for use in the method of the invention comprising a deep furnace chamber of generally rectangular vertical cross section which is capable of being tilted about a fixed pivot and which is provided with at least one heater and, at or near the top of the furnace, with means for charging the furnace and a spout for discharging material from the furnace, the furnace further being equipped with a consumable lance for introducing into the furnace a jet of an oxygen-containing gas and an annular shroud of coolant gas about the oxygen-containing gas jet which lance extends lengthwise of itself from the interior to the exterior of the furnace through a guide tube provided in a wall, such as a side or bottom wall, of the furnace and is capable of being fed lengthwise from the exterior to the interior of the furnace through the lance guide tube.

A preferred furnace for use in the present invention will now be described in more detail, by way of example, with reference to the accompanying drawings, in which.

Figure 1:
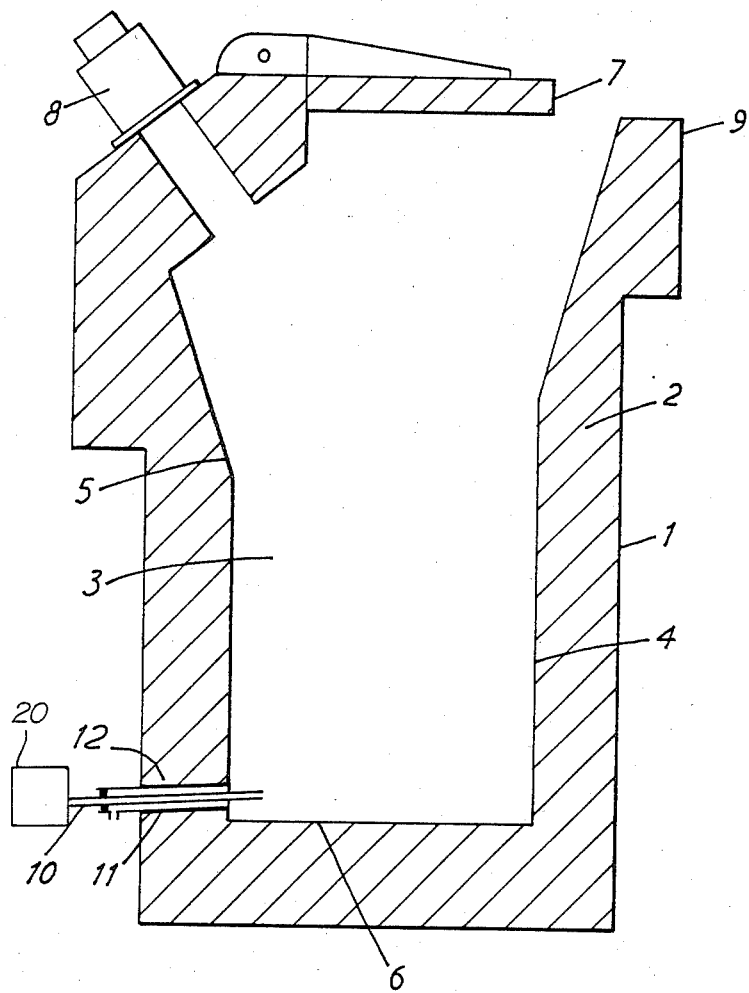
FIG. 1 is a schematic vertical section of a furnace.
Figure 2:
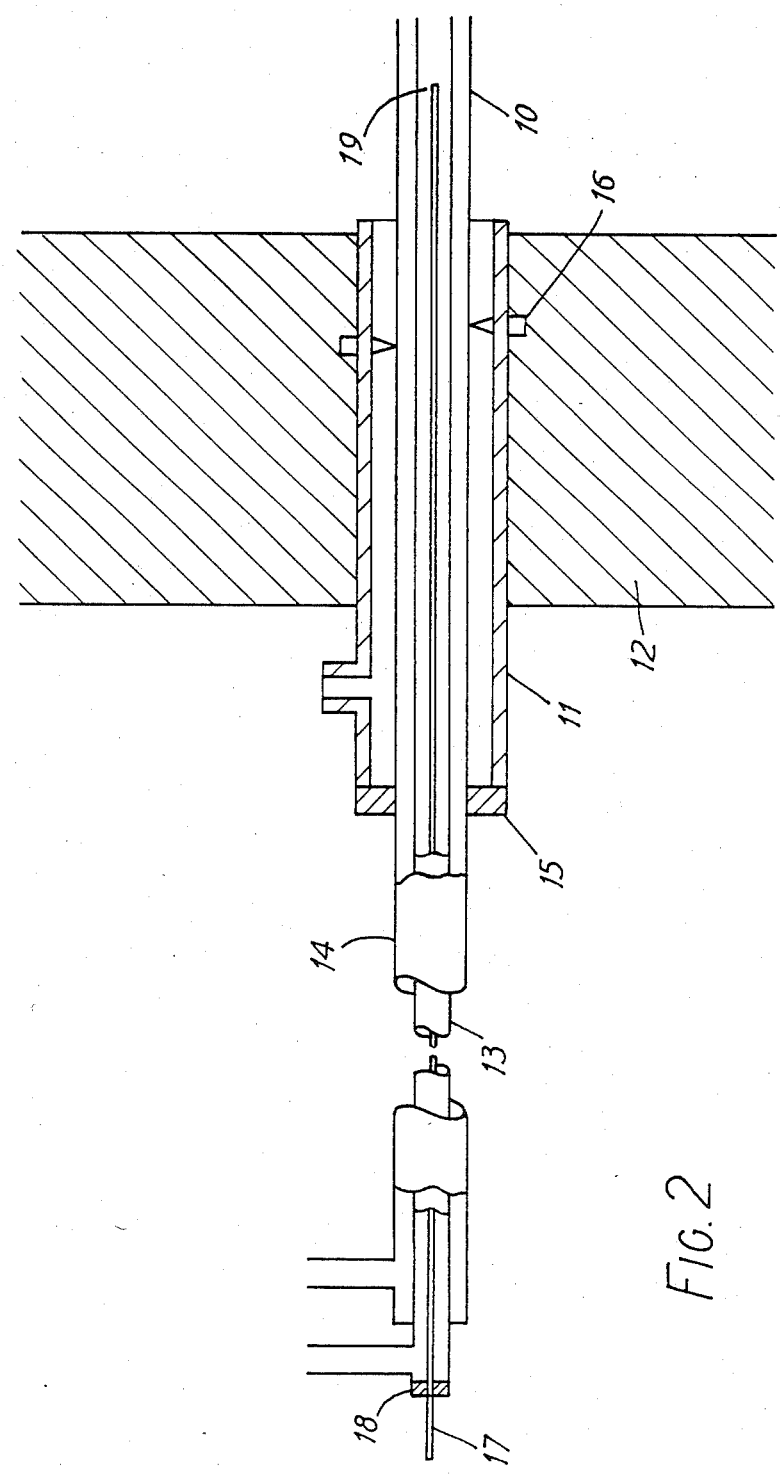
FIG. 2 is a schematic vertical section of a preferred construction of the lance used in the furnace illustrated in FIG. 1.

In FIG. 1, the furnace consists of the usual steel casing 1 having a refractory lining 2. The furnace contains a deep chamber 3 of generally rectangular vertical cross section defined by internal walls 4, 5, base 6 and openable lid 7 which can be opened for charging the furnace. The furnace is equipped with a burner 8 in the recessed wall 5 for heating contents of the furnace and a spout 9 near the top of wall 4 for discharging slag and molten metal from the chamber when the furnace is tilted. A lance (FIG. 2) 10 for injecting oxygen and an annular shroud of nitrogen into the bath during operation extends lengthwise of itself from the interior to the exterior of the furnace through a guide tube 11 located in a cast refractory section 12 in the wall 5 near to the base 6. The lance 10 comprises (FIG. 2) an elongate core tube 13, formed of stainless steel which is located in a lance tube 14, also formed of stainless steel. The core tube typically has an internal diameter of 4.57 mm and an external diameter of 6.35 mm and the concentric annular lance tube 14 typically has an external diameter of 9.53 mm and a wall thickness of about 1.25 mm thus providing an annular gap between the external surface of the tube 13 and the internal surface of tube 14 having a width of about 0.34 mm. The lance 10 is positioned in the lance guide tube by means of a sliding seal or gland 15 and grub screw spacers 16 provided on the inside of the guide tube. Therefore, although the lance is sealed in the guide tube it is slidable therethrough such that the lance can be advanced lengthwise through the guide tube into the furnace chamber. This facilitates the replacement of the lance as it is consumed during operation of the furnace. Typically, the lance, in use, extends beyond the refractory lining in the furnace by about 4 cm. During operation, the guide tube is connected to a supply of nitrogen gas to provide a nitrogen shroud around the lance.

A thermocouple 17, is fixed relative to the furnace body and located in the lance core tube. This thermocouple is used to automatically control the lance feed, and it remains in position whilst the lance is advanced forward into the furnace chamber. The thermocouple is sealed at the outer end of the core tube with another gland 18. As the lance is consumed or burnt back, its hot tip is detected by the tip of the thermocouple 19 which signals a motor to drive the lance forward.

Figure 3:
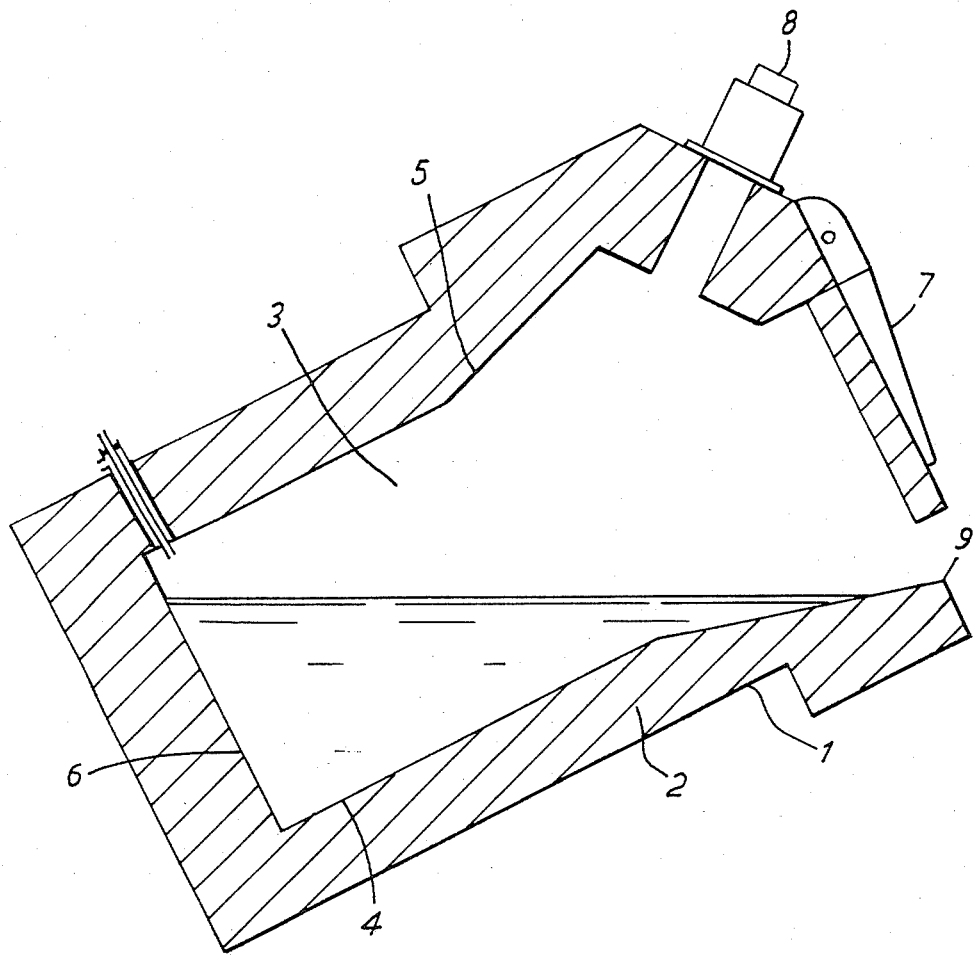
FIG. 3 is a schematic vertical section view of the furnace illustrated in FIG. 1 in a tilted position and containing a metal charge.
Figure 4:
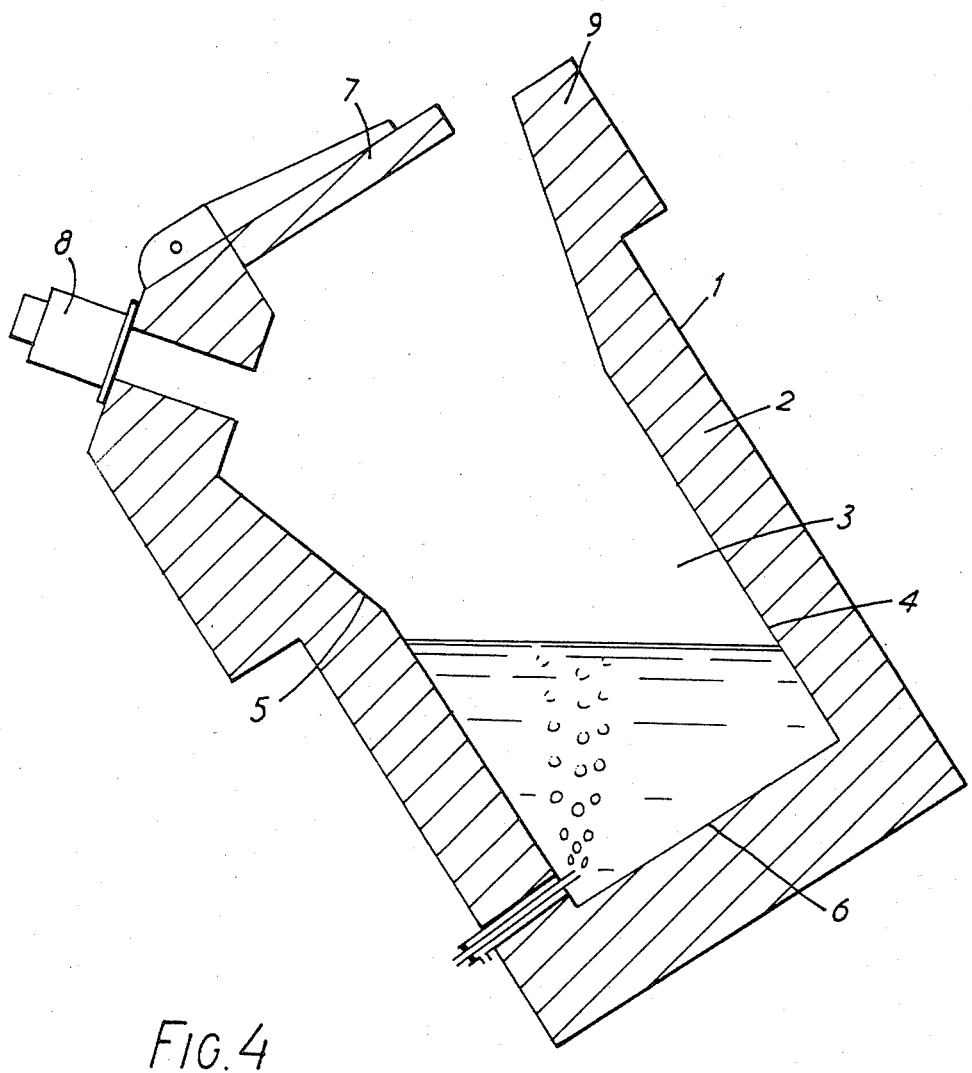
FIG. 4 is a schematic vertical section of the furnace of FIG. 3 in the reacting position.

This procedure continues until all of the lance has been consumed and then a new lance may be fitted whilst the furnace is tilted forward. A charge of silver-lead bullion is added to the furnace via the openable lid 7. In the tilted position, (FIG. 3) the burner 8 can be fired to melt the bullion after which the furnace is tilted backwards to the reacting position (FIG. 4) so that the end of the lance 11 extends into the melt. A stream of oxygen inside a protective shroud of nitrogen can be injected via the lance into the melt. The temperature of the molten bullion during oxygen injection can be controlled to avoid excess superheat by varying gas flows and pressures in the lance. The litharge slag which is formed by the oxygen-lead reaction may be removed by tilting the furnace as in FIG. 3 until the liquid metal level meets the spout 9 and can be poured off. The gas blown from the lance assists in the final slag removal and the burner 8 is used to supply heat to maintain a free flowing slag.

The method of the present invention using the above described furnace is illustrated by the following examples.

EXAMPLE 1

In one particular furnace run using a consumable nitrogen shrouded oxygen lance, 1530 Kg of 65% silver, 2.2% zinc, 4.0% copper - lead bullion was refined to 99.9% silver. The bullion was in the form of nine blocks each weighing approximately 170 Kg. An initial charge of seven blocks weighing 1190 Kg was loaded into the furnace and melted in 90 minutes by a gas-air burner operating at an average firing rage of 8.6 therms/hour.

The furnace was positioned at an angle which kept the lance above the liquid bath and the gas burner was used to raise the bath temperature to 785° C. which is approximately 50° C. above the metal liquidus temperature. During this period the lance assembly was cooled by nitrogen set at the following flow rates:
lance guide tube: 0.15 NL/S
lance shroud: 0.15 NL/S
lance core: 0.15 NL/S When the required bath temperature was obtained the burner was reduced to minimum fire (1.3 therms/hour) and the following oxygen and nitrogen gas flows were set before tilting the furnace to the reacting position:
lance guide tube: 0.3 NL/S nitrogen
lance shroud: 0.5 NL/S nitrogen
lance core: 6.0 NL/S oxygen Oxygen injection continued with the burner operating a low fire for the first 10 minutes and then it was switched off as the exothermic oxidation reaction served to maintain the bath temperature above the rising liquidus. The lance automatic feed system kept approximately 4 cm of lance protruding into the furnace. After 25 minutes the first litharge slag was removed (approx. 80 Kg) and one further block of bullion was added to the bath. Whilst pouring the litharge slag the burner was operated at low fire to maintain a free flowing slag and the oxygen flow rate was reduced to avoid too much heat loss.

The furnace was again tilted to the reacting position and oxygen injection proceeded at 6.0 NL/S for 40 minutes without the gas burner. Litharge was again poured (approx. 170 KG) with the burner on low fire and oxygen reduced to a minimum. The final block of lead-silver bullion was then charged to the bath and oxygen injection continued at 6 NL/S with the furnace reacting position and the burner off. After a further 15 minutes oxygen injection the bath composition was estimated at 80% silver and the oxygen flowrate was reduced to 5 NL/S and the burner was positioned at low fire. As the lead is oxidised and removed from the bath the litharge formation reaction slows down and therefore the heat generation reduces. The burner firing rate is then gradually increased and the oxygen flowrate is gradually decreased. If this practice is not performed, the excess oxygen at the lance tip causes cooling and hence freezing of the silver-rich metal.

Thirty minutes later the litharge slag (approx. 200 Kg) was removed and the oxygen injection continued with the flowrate reduced to 4 NL/S. The estimated bath composition at this stage was 90% silver and a bath temperature of 980° C. was recorded.*

Litharge slag removal was performed again after 40 minutes of oxygen blowing at 4 NL/S resulting in 100 Kg of the slag. At this stage a medium fire was required as the bath was about 98% silver. Blowing with oxygen produced no more slag and so the copper removal process by the addition of lead was carried out.

Four lead additions of 75 Kg each were charged and the litharge slag layer was removed after 30 minutes oxygen injection between each addition. An oxygen flowrate of 3 NL/S and a low to medium burner firing rate was used during this process. The weight of litharge removed was 350 Kg which brought the total weight of litharge slag produced to 900 Kg.

The silver was refined to 99.8% and ready to pour after a total time of 360 minutes from the start of oxygen injection. During pouring the burner was set on a high firing rate to keep the bath hot and maintain a steady metal flow. The mass of silver produced was 977 Kg and the percentage of total silver diverted to litharge was 1.7%.

The total energy consumed during this run was 46 therms and the oxygen and nitrogen consumptions were 62 m$^3$ and 20 m$^3$ respectively. One full lance was used for this furnace run (30 cm consumed).

EXAMPLE 2

The same process described in example 1 was used to refine 1300 Kg of 40% silver, 5% copper, 2% zinc - lead bullion. The metal was again charged in the form of solid blocks and the bath temperature was raised to 700° C. as the metal liquidus (approx. 620° C.) was too low to commence the oxidation reaction. With the furnace in the reacting position and the burner on low fire (1.5 therms/hour), oxygen was injected at 6 NL/S for 40 minutes and 200 Kg of litharge was produced. As in example 1 the automatic lance feed maintained the lance tip approximately 4 cm into the furnace.

The litharge slap was removed and oxygen injection continued at 6 NL/S with the furnace in the reacting position and the gas burner was switched off. The energy from the exothermic oxidation of lead was sufficient to maintain the bath temperature above the rising liquidus temperature. The oxygen was reduced and the burner set to low fire to assist in the removal of slag (200 Kg) after a further 30 minutes oxygen injection.

Again injection of oxygen continued for another 30 minutes and approximately 200 Kg of slag was removed. The bath composition was now approximately 70% silver and the temperature was 850° C.

A further 30 minutes oxygen injection at 6 NL/S produced 150 Kg litharge slag and a metal bath containing approximately 90% silver. The slag was removed and oxidation continued with an oxygen flowrate of 4 NL/S with the burner on low fire. After 30 minutes a final 80 Kg of litharge was removed and the bath composition was approximately 97% silver.

The normal copper removal process was now performed with four 75 Kg lead additions. The burner was positioned at a low to medium fire and oxygen was injected at 3 NL/S. The automatic lance feed was still controlling the lance to protrude 4 cm into the furnace. However, during the third lead addition the lance required changing which was performed with the furnace in the tilted or melting position and took only a few minutes.

The litharge produced from lead addition amounted to 330 Kg bringing the total slag produced to 1160 Kg.

A total mass of 508 Kg silver was produced after 390 minutes from the start of oxygen injection. The total energy consumed was 40 therms and the oxygen and nitrogen gas consumptions were 73 m$^3$ and 22 m$^3$ respectively. Silver diversion to slag was 2.3%, the oxygen utilisation averaged 80% (approximately).

I claim:

1. A method of recovering a metal selected from the noble metals and bismuth from an alloy containing lead and the metal comprising melting the alloy in a furnace having an interior and an exterior, injecting into the melt a stream of oxygen-containing gas thereby oxidizing the lead to form a lead oxide slag which stream is cooled by an annular shroud of a coolant gas, and removing the slag from the surface of the melt, wherein the oxygen-containing gas and a first coolant gas are injected into the melt through an elongate, consumable lance formed of a first elongate tube for the oxygen-containing gas and a second elongate tube, located annularly about the first tube, for the first coolant gas, wherein the consumable lance extends lengthwise of itself from the interior to the exterior of the furnace through a lance guide tube provided in a wall of the furnace and is capable of being fed lengthwise from the exterior to the interior of the furnace through the guide tube as the lance is consumed in the furnace, and wherein a stream of a second gas is injected through the guide tube into the furnace to seal the lance.

2. The method according to claim 1, wherein the metal to be recovered is silver.

3. The method according to claim 2, wherein silver is recovered from silver-lead bullion containing at least 5% by weight of silver.

4. The method according to claim 1, wherein oxygen is used as the oxygen-containing gas.

5. The method according to claim 1, wherein the first coolant gas is selected from nitrogen, a hydrocarbon gas and mixtures of these.

6. The method according to claim 1, wherein the second gas, which is injected through the lance guide tube into the furnace, is nitrogen.

7. The method according to claim 1, wherein the temperature of the melt during the injection of the oxygen-containing gas is maintained at a value not more than 100° C. above the estimated liquidus temperature of the alloy.

8. The method according to claim 1, wherein, as the tip of the lance is burnt back during the oxidation of the lead in the furnace, the lance is advanced lengthwise from the exterior to the interior of the furnace through the guide tube by means of a motor situated outside the furnace.

9. The method according to claim 8, wherein the advance of the lance into the furnace by the motor is controlled by a thermocouple fixed relative to the furnace body and located in the first elongate tube of said consumable lance.

10. A furnace having an interior and an exterior, comprising a deep furnace chamber of generally rectangular vertical cross section which is capable of being tilted about a fixed pivot and which is provided with at least one heater and, at or near the top of the furnace, with means for charging the furnace and with a spout for discharging material from the furnace, the furnace further being equipped with an elongate, consumable lance formed of a first elongate tube and a second elongate tube located annularly about the first tube which lance extends lengthwise of itself from the interior to the exterior of the furnace through a guide tube provided in a wall of the furnace and is capable of being fed lengthwise from the exterior to the interior of the furnace through the lance guide tube.

11. The furnace according to claim 10, wherein the first tube of the lance is connected to a source of an oxygen-containing gas, the second tube is connected to a source of a coolant gas and the guide tube in the furnace wall is connected to a source of a coolant gas.

12. The furnace according to claim 10, which is further provided with a motor located on the exterior of the furnace for advancing the consumable lance lengthwise from the exterior to the interior of the furnace.

13. The furnace according to claim 12, wherein a thermocouple is fixed relative to the furnace body and is located in the lance core tube; the advance of the lance into the furnace by the motor being controlled by the thermocouple.

14. A furnace according to claim 11 which is further provided with a motor located on the exterior of the furnace for advancing the consumable lance lengthwise from the exterior to the interior of the furnace.

* * * * *